United States Patent [19]
Dutton

[11] Patent Number: 5,802,330
[45] Date of Patent: Sep. 1, 1998

[54] COMPUTER SYSTEM INCLUDING A PLURALITY OF REAL TIME PERIPHERAL DEVICES HAVING ARBITRATION CONTROL FEEDBACK MECHANISMS

[75] Inventor: Drew J. Dutton, Austin, Tex.

[73] Assignee: Advanced Micro Devices, Inc., Sunnyvale, Calif.

[21] Appl. No.: 644,405

[22] Filed: May 1, 1996

[51] Int. Cl.⁶ .................................................. G06F 13/18
[52] U.S. Cl. .................................................. 395/296
[58] Field of Search .................................. 395/296, 293, 395/303

[56] References Cited

U.S. PATENT DOCUMENTS

| | | |
|---|---|---|
| 4,096,571 | 6/1978 | Vander Mey . |
| 4,245,344 | 1/1981 | Richter . |
| 4,339,808 | 7/1982 | North . |
| 4,682,282 | 7/1987 | Beasley . |
| 4,953,081 | 8/1990 | Feal et al. . |
| 4,972,313 | 11/1990 | Getson, Jr. et al. . |
| 4,974,148 | 11/1990 | Matteson . |
| 5,146,596 | 9/1992 | Whittaker et al. . |
| 5,245,322 | 9/1993 | Dinwiddie, Jr. et al. . |
| 5,265,223 | 11/1993 | Brockmann et al. . |
| 5,274,763 | 12/1993 | Banks . |
| 5,345,566 | 9/1994 | Tanji et al. . |
| 5,392,033 | 2/1995 | Oman et al. . |
| 5,396,602 | 3/1995 | Amini et al. . |
| 5,404,463 | 4/1995 | McGarvey . |
| 5,463,624 | 10/1995 | Hogg et al. . |
| 5,467,454 | 11/1995 | Sato . |
| 5,471,590 | 11/1995 | Melo et al. . |
| 5,524,235 | 6/1996 | Larson et al. . |
| 5,526,017 | 6/1996 | Wilkie . |
| 5,533,205 | 7/1996 | Blackledge, Jr. et al. . |
| 5,535,341 | 7/1996 | Shah et al. . |
| 5,546,546 | 8/1996 | Bell et al. . |
| 5,572,686 | 11/1996 | Nunziata et al. . |
| 5,574,867 | 11/1996 | Khaira . |
| 5,583,999 | 12/1996 | Sato et al. . |

FOREIGN PATENT DOCUMENTS

| | | |
|---|---|---|
| 0 121 030 A1 | 10/1984 | European Pat. Off. . |
| A 0 629 955 | 12/1994 | European Pat. Off. . |
| 0 718 774 A1 | 6/1996 | European Pat. Off. . |
| 2 165 726 | 4/1985 | United Kingdom . |
| 93/16434 | 8/1993 | WIPO . |
| 95/28786 | 10/1995 | WIPO . |

OTHER PUBLICATIONS

IBM Technical Disclosure Bulletin, Oct. 1992, vol. 35, "Extended Micro Channel for Realtime Multimedia Applications", pp. 8–10.

(List continued on next page.)

Primary Examiner—Glenn A. Auve
Attorney, Agent, or Firm—Conley, Rose & Tayon; B. Noel Kivlin

[57] ABSTRACT

A computer system includes a bus arbiter for controlling the ownership of a bus to which a variety of both real time and non-real time resources are coupled. The bus arbiter includes a request detection unit for detecting bus request signals of a plurality of bus masters, and a grant generator for generating corresponding grant signals to indicate a grant of ownership of the bus. A set of programmable registers are provided to receive configuration information for controlling the relative priority given to each of the bus masters when bus request contention occurs. One or more of the bus masters includes an arbitration feedback control circuit and feedback register for generating and storing a value to indicate whether the latency in obtaining the bus during a previous bus request phase was generous, was acceptable, or was longer than desired (i.e., the latency requirement for the device was either violated or the latency in obtaining the bus reached a near-critical point). If the value in the feedback register of a particular peripheral indicates the master desires faster access to the bus, an arbitration control unit of the bus arbiter increases a level of arbitration priority given to that master for future bus requests. Similarly, if the value in the feedback register of a peripheral indicates the master received ownership of the bus during a previous bus request phase with ample time, the arbitration control unit may decrease a level of arbitration priority given to the device.

23 Claims, 5 Drawing Sheets

OTHER PUBLICATIONS

IBM Technical Disclosure Bulletin, May 1989, vol. 31, "Priority Scheduling Algorithm", pp. 271–272.

International Search Report for PCT/US 96/11981, dated Feb. 25, 1997.

PCI Local Bus Multimedia Design Guide, Revision 1.0, Mar. 29, 1994, pp. 1–40.

Peripheral Component Interconnect (PCI) Revision 1.0 Specification, Jun. 22, 1992, cover page and pp. 26–33.

IBM Technical Disclosure Bulletin, vol. 38, No. 4, Apr. 1995; New York, US, pp. 535–538, XP002016389, "Micro-Channel Architecture For Real–Time Multimedia".

IBM Technical Disclosure Bulletin, vol. 35, No. 5, Oct. 1992, New York, US, pp. 8–10, XP002016386, "Extended Microchannel for Realtime Multimedia Applications".

Patent Abstracts of Japan, vol. 14, No. 214 (P–1044), May 7, 1990 & JP, A, 02 048765 (NEC Corporation).

COMPUTER SYSTEM INCLUDING A PLURALITY OF REAL TIME PERIPHERAL DEVICES HAVING ARBITRATION CONTROL FEEDBACK MECHANISMS

BACKGROUND OF THE INVENTION

1. Field of the Invention

This invention relates to bus arbitration within computer systems and more particularly to a computer system having an improved bus arbitration subsystem for arbitrating bus accesses of a CPU, real time DSP hardware, and other system resources.

2. Description of the Relevant Art

Computer architectures generally include a plurality of devices interconnected by one or more buses. For example, conventional computer systems typically include a CPU coupled through bridge logic to a main memory. The bridge logic also typically couples to a high bandwidth local expansion bus, such as the Peripheral Component Interconnect (PCI) bus or the VESA (Video Electronics Standards Association) VL bus. Modern local bus standards such as the PCI bus and the VL bus are not constrained by a requirement to be backwards compatible with prior expansion bus adapters and thus provide much higher throughput than older expansion buses. Examples of devices which can be coupled to local expansion buses include SCSI adapters, network interface cards, video accelerators, audio cards, telephony cards, etc. An older-style expansion bus may also be coupled to the local expansion bus to provide compatibility with earlier-version expansion bus adapters. Examples of such expansion buses include the industry standard architecture (ISA) bus, also referred to as the AT bus, the extended industry standard architecture (EISA) bus, and the microchannel architecture (MCA) bus. Various devices may be coupled to this second expansion bus, including a fax/modem, sound card, etc.

A CPU local bus arbiter as well as a PCI bus arbiter are typically included as part of the bridge logic in many computer systems. The CPU local bus arbiter determines and prioritizes ownership of the CPU local bus, while the PCI bus arbiter determines and prioritizes ownership of the PCI bus. Mastership of either bus is typically based on a fixed arbitration fairness scheme, such as a round-robin algorithm. In some situations, a master must acquire ownership of both the PCI bus and the CPU local bus before it can proceed with a particular transfer.

Computer systems were originally developed for business applications including word processing and spreadsheets, among others. Recently, computer systems have evolved toward more real time applications, including multimedia applications such as video and audio, video capture and playback, telephony, and speech recognition. Computer systems originally designed for business applications, however, are not well suited for the real time requirements of modern multimedia applications. For example, current operating systems for personal computers are usually not real time operating systems. In addition, the bus architecture of modern personal computer systems still presumes that the majority of applications executing on the computer system are non-real time, business applications such as word processing and/or spreadsheets which are executed solely by the main CPU.

Another problem associated with modern computer systems is that the bus arbiter which arbitrates between real time resources, non-real time resources and the CPU is typically designed to provide the CPU with maximum availability to the system memory, or is otherwise not cognizant of the real time accesses of other bus mastering devices. Real time devices can accordingly be "starved" of data, particularly when a relatively large number of real time devices are included within the system. This can correspondingly result in degraded performance, unsynchronized audio and video, and the dropping of frames during video or animation sequences.

In addition, systems including bus arbiters that employ fixed arbitration priority schemes do not account for variations in the needs of various devices at different times. Such systems similarly do not account for changes in the system configuration, such as variations due to the addition or removal of one or more peripheral devices. A system is thus desirable wherein real time devices obtain adequate access to the system busses and wherein bus arbitration is dynamically varied to account for varying requirements of the system.

SUMMARY OF THE INVENTION

The problems outlined above are in large part solved by a computer system including a plurality of real time peripheral devices having arbitration control feedback mechanisms in accordance with the present invention. In one embodiment, a computer system is provided that includes a bus arbiter for controlling the ownership of a bus to which a variety of both real time and non-real time resources are coupled. The bus arbiter includes a request detection unit for detecting bus request signals of a plurality of bus masters, and a grant generator for generating corresponding grant signals to indicate a grant of ownership of the bus. A set of programmable registers are provided to receive configuration information for controlling the relative priority given to each of the bus masters when bus request contention occurs. One or more of the bus masters includes an arbitration feedback control circuit and feedback register for generating and storing a value to indicate whether the latency in obtaining the bus during a previous bus request phase was "generous", was acceptable, or was longer than desired (i.e., the latency requirement for the device was either violated or the latency in obtaining the bus reached a near-critical point). The bus arbiter includes a state machine configured to periodically read the feedback registers of the peripherals and to update the arbitration configuration information accordingly. If the value in the feedback register of a particular peripheral indicates the master desires faster access to the bus, an arbitration control unit of the bus arbiter increases a level of arbitration priority given to that master for future bus requests. Similarly, if the value in the feedback register of a peripheral indicates the master received ownership of the bus during a previous bus request phase with ample time, the arbitration control unit may decrease a level of arbitration priority given to the device. The arbitration feedback control circuit and feedback register of each peripheral thus provides feedback to the arbiter to adjust the priority given to the device for future transactions. In another embodiment, each real time device is configured to directly update a corresponding programmable register in the bus arbiter when adjustments in the priority for that device are desired.

Broadly speaking, the present invention contemplates a computer system comprising a first master coupled to a bus and a bus arbiter for controlling and prioritizing ownership of said bus. The bus arbiter includes an arbitration control unit configured to adjust a level of arbitration priority given to the first master depending upon a feedback signal generated by the first master following a bus transaction effectuated by the first master.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
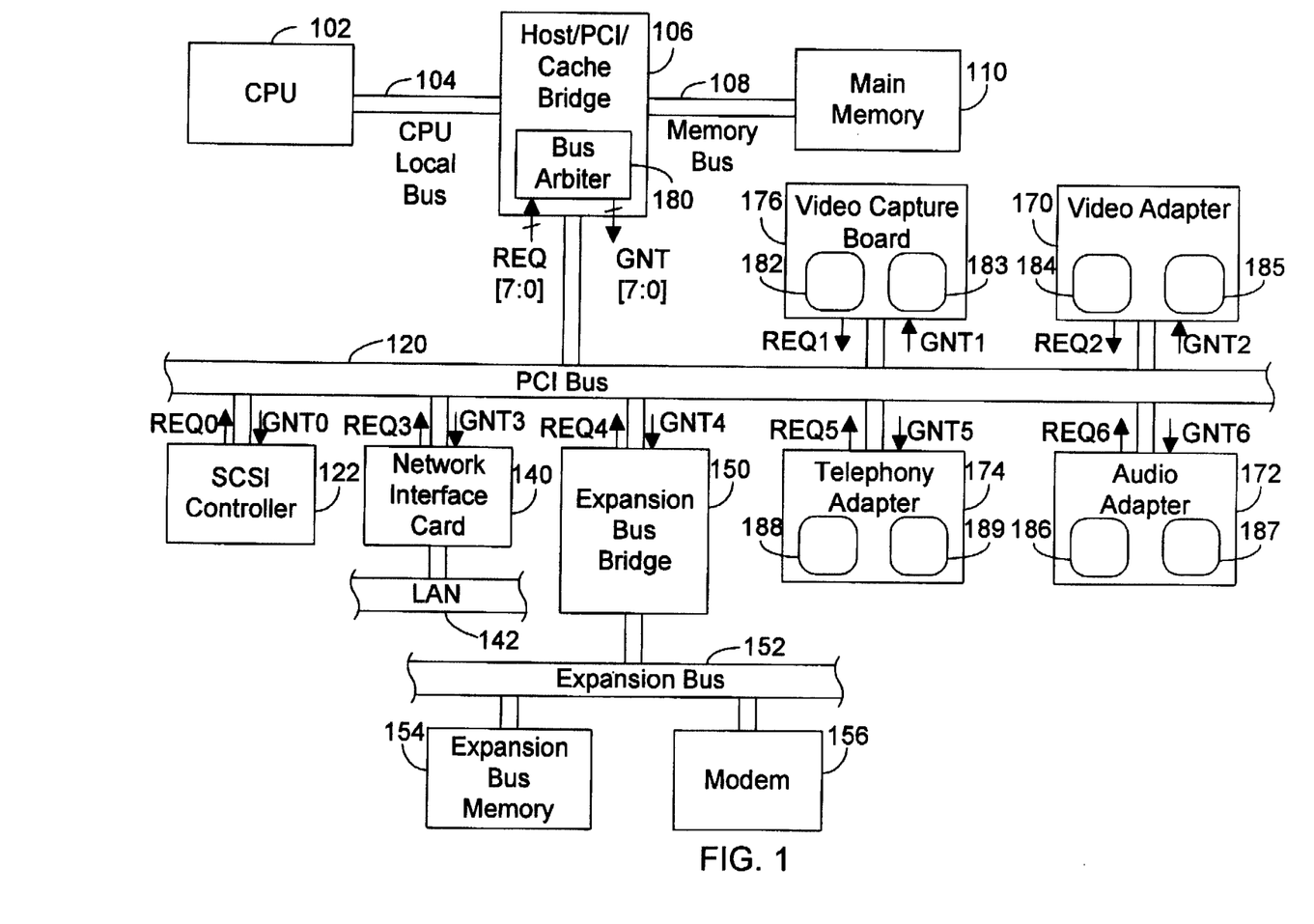
FIG. 1 is a block diagram of a computer system including a variety of real time resources and a bus arbiter in accordance with the present invention.

Referring now to FIG. 1, a block diagram of a computer system incorporating a plurality of bus devices and bus arbitration logic in accordance with the present invention is shown. As illustrated in the figure, the computer system includes a central processing unit (CPU) 102 which is coupled through a CPU local bus 104 to a host/PCI/cache bridge 106. The bridge 106 includes memory control logic and is coupled through a memory bus 108 to a main memory 110. A cache memory subsystem (not shown) may further be coupled to bus bridge 106.

Bus bridge 106 also interfaces to a peripheral component interconnect (PCI) bus 120. Further details regarding PCI bus 120 may be found within the publication "PCI Local Bus Specification"; Revision 2.0; Apr. 30, 1993; PCI Special Interest Group; Hillsboro, Oreg. This publication is incorporated herein by reference in its entirety. It is noted that other local buses could be alternatively employed, such as the VESA (Video Electronics Standards Association) VL bus.

CPU 102 is illustrative of, for example, an x86 microprocessor such as an 80486 microprocessor or a Pentium-compatible microprocessor. It is understood, however, that a system according to the present invention may employ other types of microprocessors. It is further understood that a system according to the present invention may be employed within a multiprocessing environment.

Various types of devices may be connected to the PCI bus 120. For the embodiment illustrated in FIG. 1, a video adapter 170 for controlling video functions is coupled to PCI bus 120. Other real time DSP devices are also preferably coupled to the PCI bus, including an audio adapter 172, a telephony adapter 174, and a video capture board 176, among others. A SCSI (small computer systems interface) disk controller 122 and a network interface card 140 are additionally shown coupled to the PCI bus 120. SCSI controller 122 is configured to provide an interface to SCSI devices such as a CD-ROM device, a tape drive device, and/or a composite disk array. The network interface card 140 interfaces to a local area network (LAN) 142.

An expansion bus bridge 150 is also preferably coupled to the PCI bus 120. The expansion bus bridge 150 interfaces to an expansion bus 152. The expansion bus 152 may be any of a variety of types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156.

A bus arbiter 180 configured to control ownership of PCI bus 120 is illustrated as a portion of bus bridge 106. The arbitration scheme employed by PCI bus 120 utilizes a unique request signal REQ# and grant signal GNT# for each PCI master. When a particular master desires ownership of PCI bus 120, it asserts its associated request signal REQ#. For example, request signal REQ2 is asserted by video adapter 170 when it requires ownership of PCI bus 120, and request signal REQ5 is asserted by telephony adapter 174 when it requires ownership of PCI bus 120, and so on. Corresponding grant signals GNT[7:0] are routed back to the masters from bus arbiter 180 to indicate the current owner of PCI bus 120. Each request signal/grant signal pair is referred to as a bus request channel. It is noted that request signal REQ4 may be asserted by expansion bus bridge 150 if access of PCI bus 120 is required by an agent of expansion bus 152, such as modem 156. It is further noted that a request signal REQ7 is generated internally by bridge 106 when it requires mastership of PCI bus 120.

FIG. 1 further illustrates an arbitration feedback control circuit and a register (referred to as an arbitration feedback register) incorporated within each real time peripheral device. More specifically, video capture board 176 includes an arbitration feedback control circuit 182 coupled to an arbitration feedback register 183. Similarly, video adapter 170 includes an arbitration feedback control circuit 184 coupled to an arbitration feedback register 185, and audio adapter 172 includes an arbitration feedback control circuit 186 coupled to an arbitration feedback register 187. Finally, telephony adapter 174 is illustrated with an arbitration feedback control circuit 188 coupled to an arbitration feedback register 189.

As will be explained in further detail below, for the embodiment of FIG. 1, a particular real time peripheral is configured to store a value within its arbitration feedback register following all or certain bus mastering transactions of the peripheral to indicate whether the latency in obtaining bus mastership for a particular transaction (or set of transactions) was acceptable, or was at a near critical or critical point. This value is stored within the arbitration feedback register of the peripheral. The bus arbiter 180 reads the arbitration feedback register of each of the real time peripherals and adjusts the priority levels given to the associated peripherals depending upon the specific values read. If the values stored within the arbitration feedback register of a particular real time peripheral indicates that the previous transaction involved a latency which was at or near a critical point, the bus arbiter 180 increases a level of arbitration priority for that device. Similarly, if the latency was better than required for a particular real time peripheral, bus arbiter 180 may decrease a level of arbitration priority given to that device.

Figure 2:
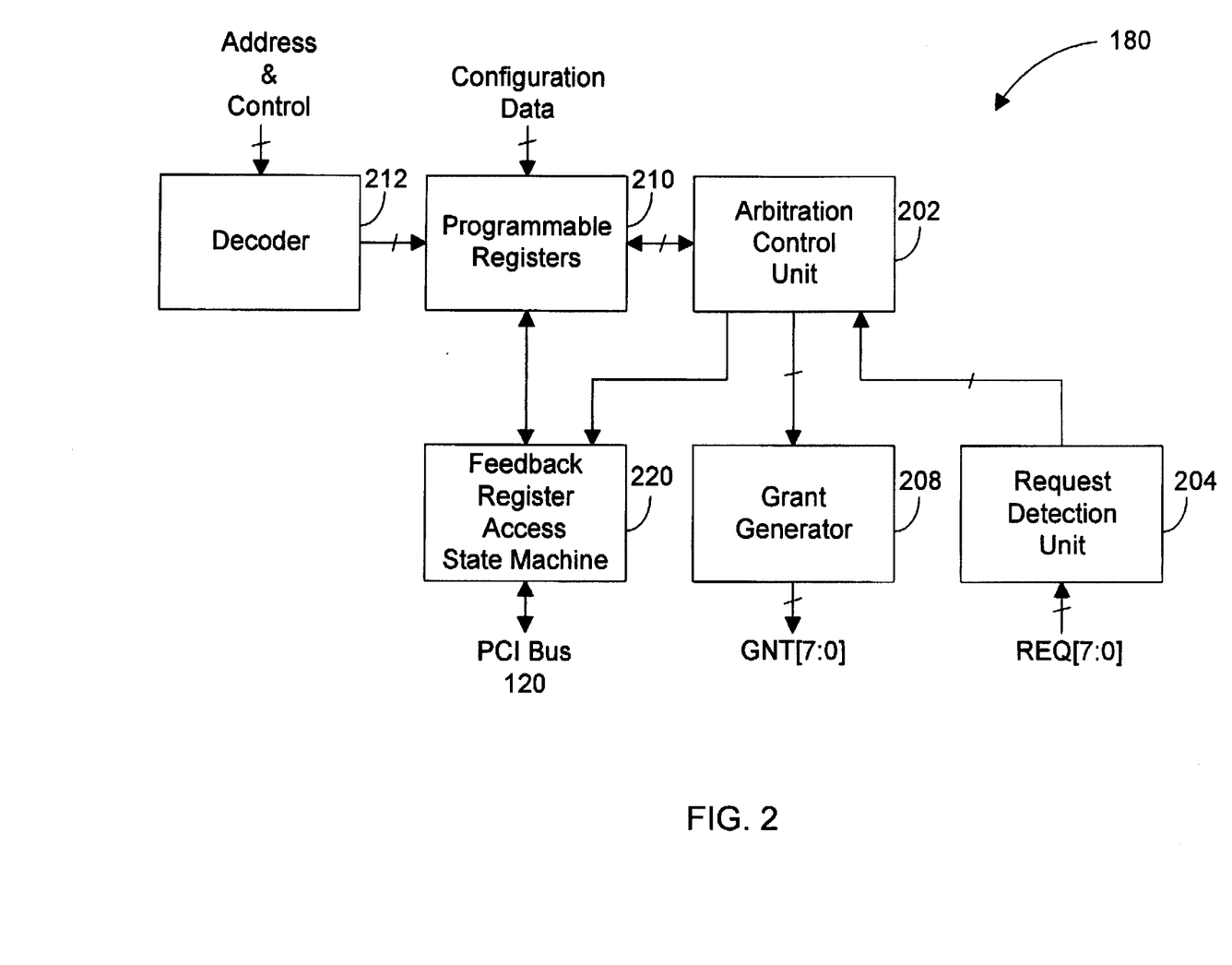
FIG. 2 is a block diagram which depicts internal portions of the bus arbiter of FIG. 1.

Further details regarding the bus arbitration subsystem employed by the system of FIG. 1 will be provided below in conjunction with the accompanying descriptions of FIGS. 2 and 3. FIG. 2 is a diagram that depicts internal portions of one embodiment of bus arbiter 180. As shown, bus arbiter 180 includes an arbitration control unit 202 coupled to a request detection unit 204, a grant generator 208, and a programmable registers unit 210. A decoder is further shown coupled to programmable registers 210. A feedback register access state machine 220 is finally shown coupled to arbitration control unit 202 and to programmable registers unit 210.

Request detection unit 204 is provided to detect assertions of request signals REQ0–REQ7, and to inform arbitration control unit 202 of such assertions. Grant generator 208 is similarly provided to selectively assert grant signals GNT0–GNT7 in response to commands from arbitration control unit 202. Programmable registers unit 210 is provided to store configuration data to set the priority level associated with each of the bus mastering devices controlled by bus arbiter 180. Programmable registers unit 210 is accessible through software command via PCI bus 120 (or CPU local bus 104) in conjunction with a decoder 212, and includes a plurality of registers or other storage elements.

During operation of the computer system employing bus arbiter 180, programmable registers unit 210 is set such that an initial priority level is programmed for each bus master. For example, FIG. 3 illustrates exemplary values programmed within programmable registers unit 210 to set the initial priority levels associated with the devices (labeled "Device 0—Device 7") corresponding to each of the request signals REQ[7:0]. In this embodiment, the higher the binary value, the higher the priority given for that device. Accordingly, as illustrated in FIG. 3, Device 2, which is associated with the request signal REQ2 (i.e., the video adapter 170 of FIG. 1), is given the highest level of priority for arbitration purposes. Device 2 thus will initially gain access to the bus in favor of any other contending masters that are also requesting the bus at the same time. The initial priority level associated with each of the other devices is also shown. When more than one master contends for the bus at a particular time, the master having the highest associated priority level of those contending for the bus wins the arbitration. It is noted that in one implementation after a higher priority peripheral has been granted ownership of PCI bus 120 and has relinquished control of the bus, other contending masters that were requesting the bus at the same time are granted the bus in priority order before the highest priority device is re-granted ownership of the bus for a subsequent transaction.

Figure 3:
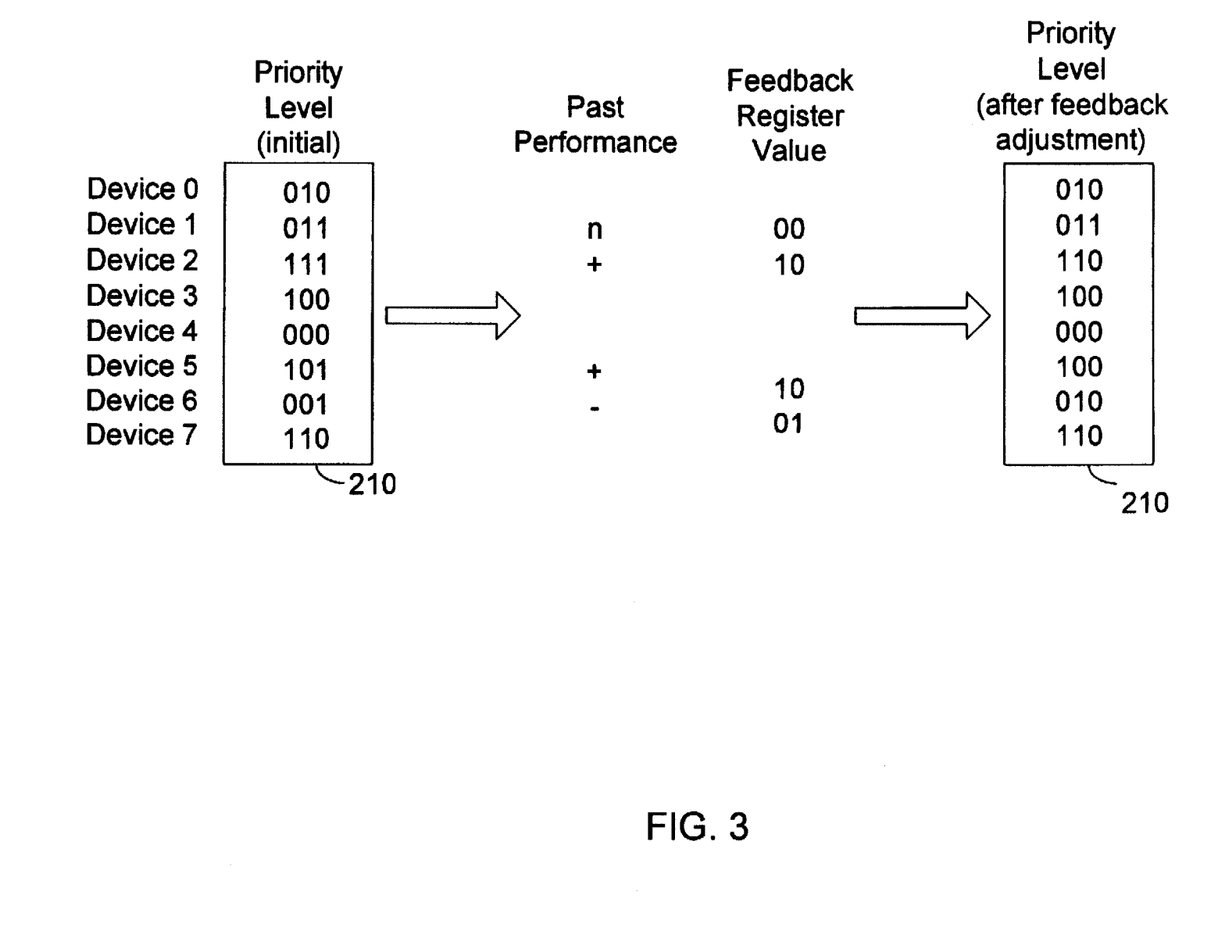
FIG. 3 is a diagram indicating exemplary initial priority levels associated with each of several peripheral mastering devices, a value associated with the feedback registers of selected peripherals, and a resulting priority level after the feedback values are applied by the arbitration control unit of FIG. 2.

FIG. 3 further illustrates indications of the past performance associated with previous transactions of video capture board 176, video adapter 170, audio adapter 172, and telephony adapter 174, as reflected by encoded values within their associated feedback registers. An encoding of "00" indicates the performance associated with the previous cycle was acceptable, the encoding of "10" indicates the performance of a previous transaction was better than required, and the encoding of "01" indicates the performance of a previous transaction either violated a latency requirement or reached a critical point. More specifically, for the situation illustrated by FIG. 3, arbitration feedback control circuit 182 generated a signal which was stored within feedback register 183 to indicate that the performance associated with a previous cycle was acceptable (reflected by the encoded value of "00" within feedback register 183). Arbitration feedback control circuit 184, on the other hand, provided a signal to feedback register 185 indicating that the performance of a previous transaction was better than required (reflected by the encoded value of "10" within feedback register 185). Similarly, arbitration feedback control circuit 186 caused a value of "10" to be stored within feedback register 187. Finally, arbitration feedback control circuit 188 caused a value of "01" to be stored within feedback register 189, thus indicating that the latency associated with a previous transaction either violated a latency requirement or reached a near-critical point.

Thus, each arbitration feedback control circuit indicates whether the latency requirement associated with a previous transaction of the corresponding device was amply met (encoded as a value of "10"), was acceptable (encoded as a value of "00"), or was violated or was at a near-critical point (encoded as a value of "01"). The arbitration feedback control circuit of each real time peripheral may be configured to cause the performance value stored within its feedback register to be updated after every transaction, or periodically after a group of bus transactions(i.e., wherein the performance rating is averaged over a predetermined number of ownership cycles, such as ten).

FIG. 3 finally illustrates the priority levels associated with each of the registers of programmable registers unit 210 (of FIG. 2) after feedback adjustment. More specifically, in one embodiment, feedback register access state machine 220 (FIG. 2) is configured to read the values stored within feedback registers 183, 185, 187, and 189 and to vary the associated arbitration priority levels assigned to each device according to the values read.

As indicated by FIG. 3, after feedback register access state machine 220 reads the feedback registers of the real time peripherals, the priority level associated with device 1 remains the same, the priority levels associated with devices 2 and 5 are decreased by one priority level, and the arbitration priority level associated with device 6 is increased by one priority level. Subsequent similar adjustments are continuously made during the operation of the system, depending upon the values stored within the feedback register of each real time peripheral. It is noted that the arbitration control circuit of each real time peripheral causes a value of "01" (i.e., causes no change in priority level) to be stored within its corresponding feedback register after being read by state machine 220. This prevents multiple adjustments in the priority level for a device based on the same previous transaction.

As described above, each feedback register 183, 185, 187, and 189 stores a two bit value. For one implementation, the arbitration feedback control circuit and feedback register of each peripheral device is configured such that, when state machine 220 performs a read to a predetermined address location, the contents of all the feedback registers are driven on PCI bus 120 simultaneously, wherein the content of each is driven on separate data lines of PCI bus 120. For example, when feedback register access state machine 220 executes a read cycle to the predetermined address location to which the feedback registers are mapped, the content of feedback register 183 is driven upon bits 0 and 1 of PCI bus 120, the content of feedback register 185 is driven upon bits 2 and 3 of PCI bus 120, the content of feedback register 187 is driven upon bits 4 and 5, and the content of feedback register 189 is driven upon bits 6 and 7. In this manner, only a single read access is required to obtain the values of all of the feedback registers to update the arbitration priority levels. It is understood that separate access cycles could be alternatively executed.

It is also noted that while in the embodiment described above feedback register access state machine 220 is configured to periodically read the feedback registers associated with the real time peripherals, in another embodiment the feedback register access state machine 220 is configured to read the feedback registers only when other devices are not requesting access to PCI bus 120. In this manner, read operations executed by state machine 220 may minimally affect overall system performance by avoiding contention with other devices that require access to PCI bus 120 simultaneously.

It is further noted that the arbitration control circuit of each real time peripheral may be configured to average the performance of a predetermined number of previous bus transactions and to store a value indicative of the average within the corresponding feedback register. In this manner, adjustments to the arbitration priority of a particular peripheral are made only as a result of an average of the performance of past transactions. This may result in improved stability in system performance.

Figure 4:
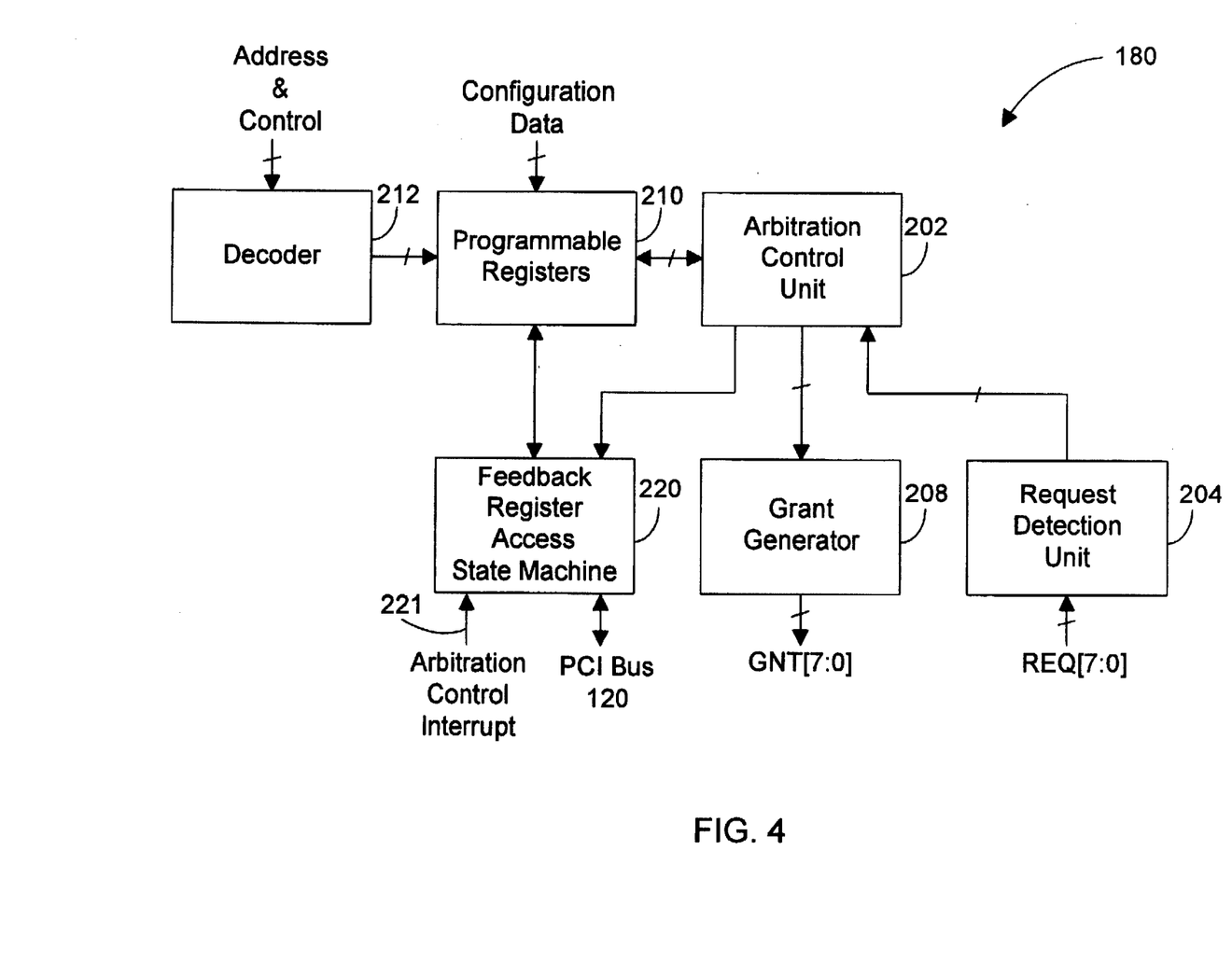
FIG. 4 is a block diagram which depicts internal portions of another embodiment of a bus arbiter.

Referring next to FIG. 4, another embodiment of bus arbiter 180 is shown. A system employing the bus arbiter of FIG. 4 is similar to that described above; however, the embodiment of FIG. 4 includes an arbitration control interrupt line 221 coupled to feedback register access state machine 220. The arbitration control interrupt line 221 is further coupled to the arbitration control circuit of each real time peripheral device. The arbitration feedback control circuit of each real time peripheral is configured to assert a signal upon the arbitration control interrupt line 221 when a value that adjusts the arbitration priority level for the device is stored in its feedback register. State machine 220 performs operations to read the feedback registers of the peripheral devices only in response to assertions of the interrupt signal at the arbitration control interrupt line.

Figure 5:
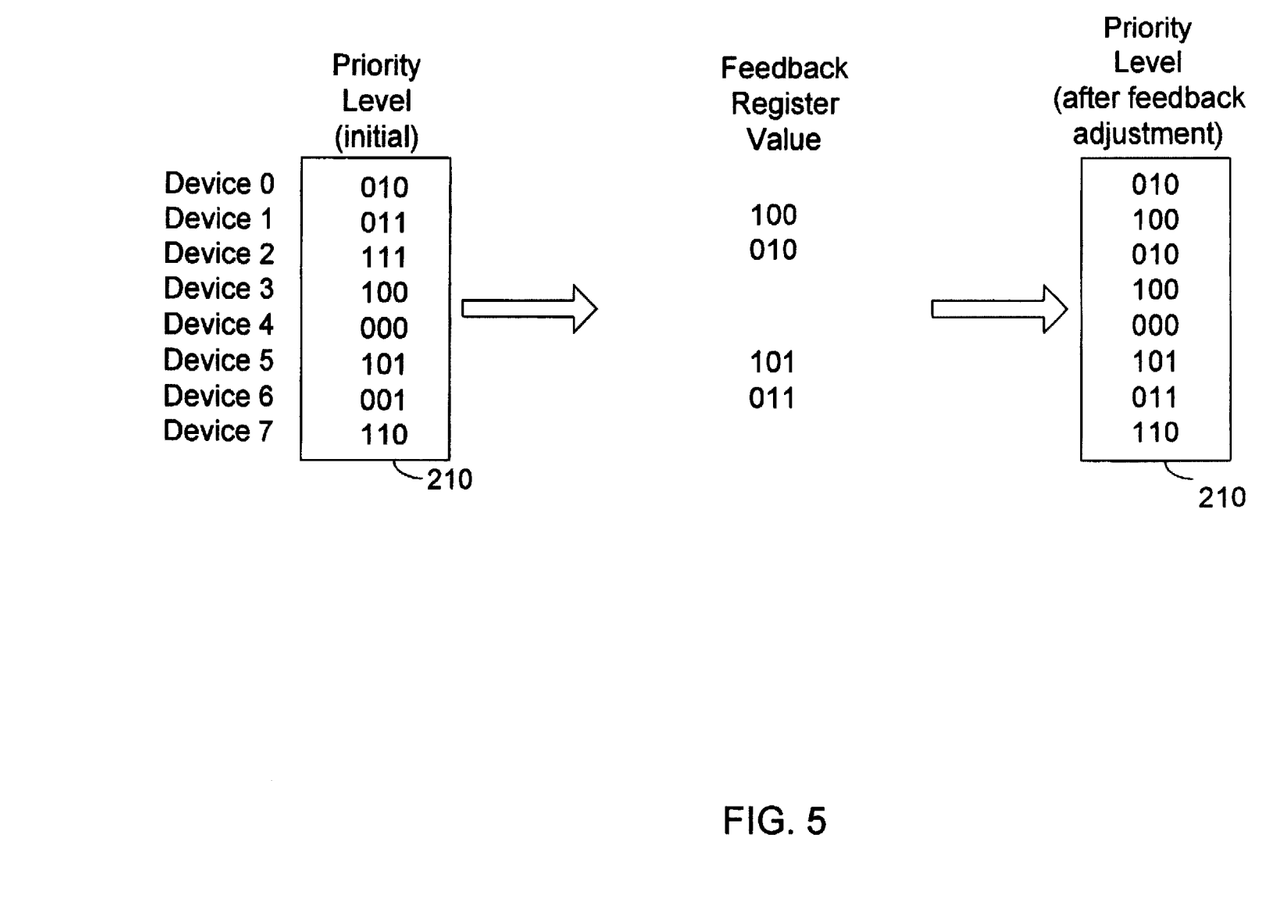
FIG. 5 is a diagram indicating arbitration priority adjustment based upon values read from each feedback register within each real time peripheral device.

Referring finally to FIG. 5, an embodiment is illustrated wherein the arbitration feedback control circuit of each real time peripheral is configured to store the actual priority level to be associated with the peripheral within the corresponding feedback register of the peripheral. Thus, when state machine 220 reads the feedback registers, the values read from the feedback registers are stored directly within the corresponding locations of programmable registers unit 210 to set the associated priority allocations. Similar to the embodiment described above, these values can be simultaneously read from the feedback registers by configuring the system such that each real time peripheral drives its feedback register content on differing bit positions of the PCI bus 120.

It is noted that while in the above described embodiments a state machine 220 is provided within bus arbiter 180 for reading the feedback register values of each real time peripheral, in an alternative embodiment, the arbitration feedback control circuit of each real time peripheral is configured to write directly to a corresponding location of the programmable registers 210 to effectuate changes in the priority level of the peripheral. In such an embodiment, state machine 220 as well as the feedback registers of each real time peripheral may be omitted.

As a result of the computer system described above, the priority level associated with various devices is dynamically adjusted based upon feedback from each real time device indicative of the past performance of the arbiter. Overall improved system performance may thereby be attained.

Numerous variations and modifications will become apparent to those skilled in the art once the above disclosure is fully appreciated. It is intended that the following claims be interpreted to embrace all such variations and modifications.

What is claimed is:

1. A computer system comprising:

a first master coupled to a bus;

a bus arbiter coupled to said bus for controlling and prioritizing ownership of said bus and including an arbitration control unit configured to adjust a level of arbitration priority given to said first master depending upon a feedback signal generated by said first master following a bus transaction effectuated by said first master;

wherein said feedback signal is indicative of an average performance associated with a pre-determined number of previous transactions of said first master.

2. The computer system as recited in claim 1 wherein said first master includes an arbitration feedback control circuit configured to generate said feedback signal.

3. The computer system as recited in claim 2 wherein said feedback signal is indicative of a performance associated with a latency in obtaining mastership of said bus following said bus transaction.

4. The computer system as recited in claim 2 wherein said first master further includes a feedback register coupled to said arbitration feedback control circuit, wherein said arbitration feedback control circuit is configured to store said feedback signal within said feedback register.

5. The computer system as recited in claim 4 wherein said bus arbiter further includes a state machine coupled to said arbitration control unit, wherein said state machine is configured to execute a cycle upon said bus to read said feedback signal from said feedback register.

6. The computer system as recited in claim 4 wherein said bus arbiter further includes a state machine coupled to said arbitration control unit, wherein said state machine is configured to execute a cycle upon said bus to read said feedback signal from said feedback register in response to an interrupt signal generated by said arbitration feedback control circuit.

7. The computer system as recited in claim 1 wherein said bus arbiter further includes a request detection unit coupled to said arbitration control unit, wherein said request detection unit is configured to detect a first request signal from said first master.

8. The computer system as recited in claim 7 wherein said bus arbiter further includes a grant generator coupled to said arbitration control unit, wherein said grant generator is configured to generate a grant signal to grant ownership of said bus to said first master.

9. The computer system as recited in claim 1 wherein said bus is a PCI bus.

10. The computer system as recited in claim 1 wherein said first master is an audio adapter.

11. The computer system as recited in claim 1 wherein said arbitration control unit is configured to increase a level of arbitration priority given to said first master in response to said feedback signal indicating a latency associated with a prior transaction of said first master was inadequate.

12. The computer system as recited in claim 1 further comprising a programmable storage unit configured to store an initial arbitration priority level associated with said first master.

13. The computer system as recited in claim 12 wherein said programmable storage unit includes a plurality of registers.

14. A computer system comprising:

a first master coupled to a bus;

a bus arbiter coupled to said bus for controlling and prioritizing ownership of said bus and including an arbitration control unit configured to adjust a level of arbitration priority given to said first master depending upon a feedback signal generated by said first master following a bus transaction effectuated by said first master;

wherein said first master includes an arbitration feedback control circuit configured to generate said feedback signal; and wherein said first master further includes a feedback register coupled to said arbitration feedback control circuit, wherein said arbitration feedback control circuit is configured to store said feedback signal within said feedback register; and wherein said bus arbiter further includes a state machine coupled to said arbitration control unit, wherein said state machine is configured to execute a cycle upon said bus to read said feedback signal from said feedback register.

15. The computer system as recited in claim 14 wherein said feedback signal is indicative of a performance associated with a latency in obtaining mastership of said bus following said bus transaction.

16. The computer system as recited in claim 14 wherein said bus arbiter further includes a request detection unit coupled to said arbitration control unit, wherein said request detection unit is configured to detect a first request signal from said first master.

17. The computer system as recited in claim 16 wherein said bus arbiter further includes a grant generator coupled to said arbitration control unit, wherein said grant generator is configured to generate a grant signal to grant ownership of said bus to said first master.

18. The computer system as recited in claim 14 wherein said bus is a PCI bus.

19. The computer system as recited in claim 14 wherein said first master is an audio adapter.

20. The computer system as recited in claim 14 wherein said arbitration control unit is configured to increase a level of arbitration priority given to said first master in response to said feedback signal indicating a latency associated with a prior transaction of said first master was inadequate.

21. The computer system as recited in claim 14 further comprising a programmable storage unit configured to store an initial arbitration priority level associated with said first master.

22. The computer system as recited in claim 21 wherein said programmable storage unit includes a plurality of registers.

23. The computer system as recited in claim 14 wherein said state machine is configured to execute said cycle upon said bus to read said feedback signal from said feedback register in response to an interrupt signal generated by said arbitration feedback control circuit.

* * * * *